(12) United States Patent
He et al.

(10) Patent No.: US 10,536,087 B1
(45) Date of Patent: Jan. 14, 2020

(54) HALF-BRIDGE POWER CONVERTER WITH PRE-CHARGING CIRCUIT

(71) Applicant: TDK-Lambda Americas Inc., Richardson, TX (US)

(72) Inventors: Jin He, Plano, TX (US); Del Hilburn, Mesquite, TX (US)

(73) Assignee: TDK-LAMBDA AMERICAS INC., Richardson, TX (US)

( * ) Notice: Subject to any disclaimer, the term of this patent is extended or adjusted under 35 U.S.C. 154(b) by 0 days.

(21) Appl. No.: 16/157,604

(22) Filed: Oct. 11, 2018

(51) Int. Cl.
*H02M 1/00* (2006.01)
*H02M 3/07* (2006.01)
*H02M 3/335* (2006.01)
*H02M 7/48* (2007.01)
*H02M 1/088* (2006.01)

(52) U.S. Cl.
CPC ....... *H02M 3/33592* (2013.01); *H02M 1/088* (2013.01); *H02M 3/07* (2013.01); *H02M 3/33569* (2013.01); *H02M 2001/0048* (2013.01); *H02M 2007/4811* (2013.01); *H02M 2007/4815* (2013.01); *H02M 2007/4818* (2013.01)

(58) Field of Classification Search
CPC ......... H02M 1/088; H02M 2001/0048; H02M 3/07; H02M 3/33569; H02M 2007/4811; H02M 2007/4815; H02M 2007/4818; H02M 2007/4822

USPC .............................. 363/17, 21.02, 21.03, 98
See application file for complete search history.

(56) References Cited

U.S. PATENT DOCUMENTS

| | | | | |
|---|---|---|---|---|
| 2013/0343090 A1* | 12/2013 | Eom | .................. | H02M 3/33507 363/16 |
| 2015/0077081 A1* | 3/2015 | Ejury | .................... | H02M 7/538 323/282 |
| 2015/0318778 A1* | 11/2015 | Gong | ...................... | H02M 1/36 363/21.02 |
| 2016/0079785 A1* | 3/2016 | Kinzer | .................. | H02J 7/0052 320/107 |

* cited by examiner

*Primary Examiner* — Jue Zhang
*Assistant Examiner* — David A. Singh
(74) *Attorney, Agent, or Firm* — David W. Carstens; Carstens & Cahoon, LLP

(57) ABSTRACT

A half-bridge power converter includes a transformer dividing the half-bridge power converter into a primary side and a secondary side. Disposed on the first side is a first capacitor bank and a second capacitor bank in series with the first capacitor hank, and also a bootstrap capacitor configured to be charged by current flowing through a charging current flowpath. The charging current flowpath extends at least through a pre-charging circuit located on the primary side, the pre-charging circuit being configured to reduce a voltage imbalance between the first capacitor bank and the second capacitor bank. The half-bridge power converter also includes a discharging current flowpath that extends at least through a primary winding of the transformer and the pre-charging circuit.

23 Claims, 10 Drawing Sheets

HALF-BRIDGE POWER CONVERTER WITH PRE-CHARGING CIRCUIT

BACKGROUND

Technical Field

Novel aspects of the present disclosure relate to power converters, and more particularly to an improved half-bridge power converter with a pre-charging circuit to reduce the voltage imbalance across the bulk capacitor banks, which reduces the asymmetrical peak voltage stress across secondary-side devices.

Background

Power converters are devices that convert an input voltage to a different voltage. For example, a DC-DC converter converts a direct current input voltage to a different current output voltage. When the output voltage is higher than the input voltage, then the DC-DC converter is a colloquially termed a "boost converter" or "step-up" converter. A DC-DC converter that provides an output voltage that is lower than the input voltage is sometimes referred to as a "buck converter" or "step-down" converter.

Different power converter topologies exist. For example, two commonly available types of power converters are full-bridge power converters—also referred to as H-bridge power converters—and half-bridge power converters. A specific power converter topology can be selected for utilization based on several different factors, one of which includes operating conditions. Some topologies are more suitable for high-voltage and/or high-power applications and are less efficient at lower voltages and/or low power, and other topologies are more suitable for low-voltage and/or low power applications and are unusable at higher voltages or high power. Additional factors that may affect selection of power converters includes cost, complexity, and size-based restrictions.

SUMMARY OF THE INVENTION

Novel aspects of the present invention are directed to a half-bridge power converter that includes a transformer dividing the half-bridge power converter into a primary side and a secondary side. Disposed on the first side is a first capacitor bank and a second capacitor bank in series with the first capacitor bank, and also a bootstrap capacitor configured to be charged by current flowing through a charging current flowpath. The charging current flowpath extends at least through a pre-charging circuit that is configured to reduce a voltage imbalance between the first capacitor bank and the second capacitor bank. The half-bridge power converter also includes a discharging current flowpath that extends at least through a primary winding of the transformer and the pre-charging circuit.

In another embodiment, novel aspects of the present invention are directed to an apparatus that includes a power supply providing a first power level and a half-bridge power converter electrically coupled to the power supply. The half-bridge power converter includes a first capacitor bank and a second capacitor bank and is connected to a resistive load so that the half-bridge power converter can provide the resistive load with a second power level that differs from the first power level. in addition, the half-bridge power converter also includes a pre-charging circuit configured to reduce a voltage imbalance between the first capacitor bank and the second capacitor bank.

In yet another embodiment, novel aspects of the present invention are directed to a method for starting a half-bridge power converter. A pre-charge switching device is activated for a charging interval duration, and a current is supplied through a charging current flowpath for the charging interval duration to charge a bootstrap capacitor. After the charging interval duration, the pre-charge switching device is deactivated and then the high-side switching device and a low-side switching device are alternately activated.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Power converters can utilize a "bootstrap technique" to generate a voltage over a supply rail to drive a high-side switching device in a conventional manner that is known in the art The voltage generated by the bootstrap technique is needed to start the power converter. For purpose of illustration, an N-channel MOSFET implemented as a high-side switching device can be activated once it receives a positive drive voltage that exceeds the gate threshold voltage ($Vgs\_th$) of the N-channel MOSFET. When the low-side N-channel MOSFET is in the OFF state, the source node voltage of the high-side switching device is greater than the voltage of the on-board power supply that is referenced to the half-bridge negative return or ground. As a result, the on-board power supply cannot provide a sufficiently high drive voltage to turn on high side N-channel MOSFET. Additional voltage can be provided by a bootstrap capacitor by the bootstrap technique using a driver circuit that is described in more detail in FIG. 1. Once the high-side and the low-side switching devices are alternately switching, the power converter can be started.

Figure 1:
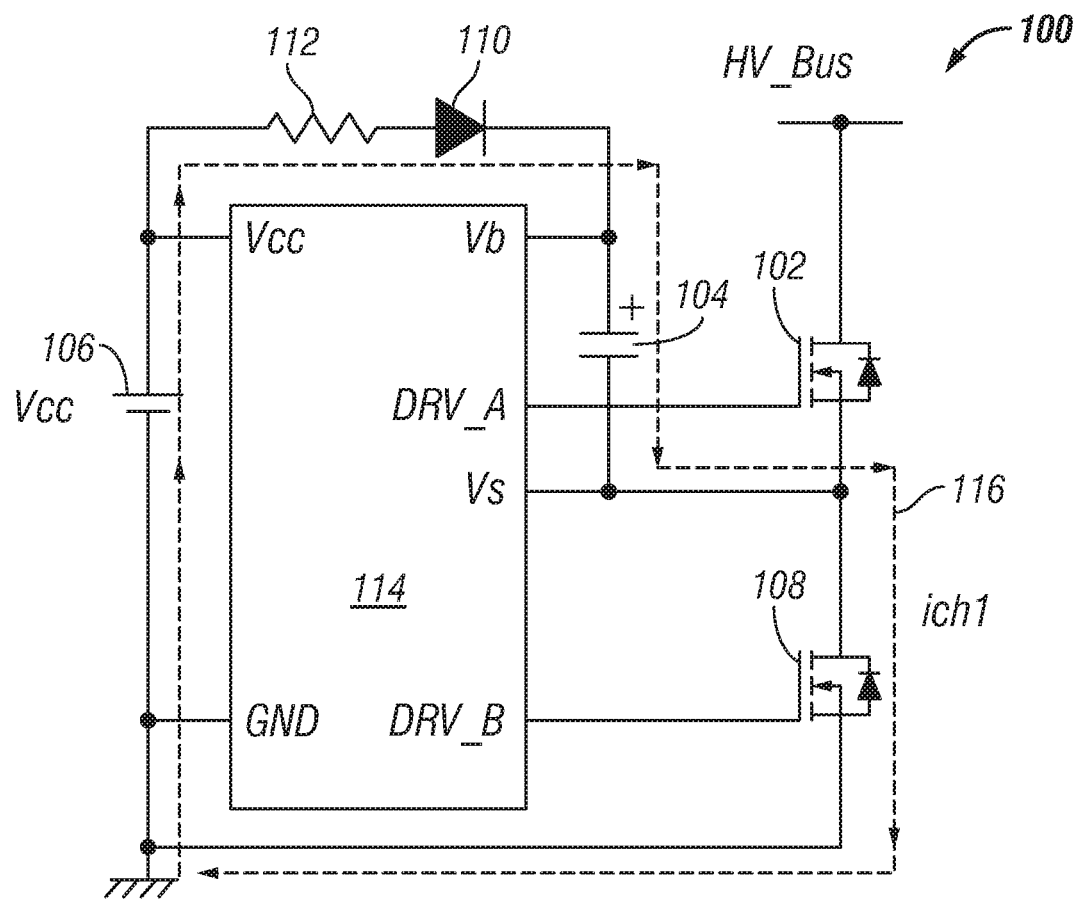
FIG. 1 is a schematic diagram of a conventional bootstrap half-bridge driver circuit.

FIG. 1 is a schematic diagram of a conventional bootstrap half-bridge driver circuit. The bootstrap half-bridge driver circuit 100 is configured to generate a voltage over the supply rail to drive a high-side switching device 102 using the "bootstrap technique" in which a bootstrap capacitor 104 is charged by a ground-referencing bias power supply 106 when the low-side switching device 108 is activated. In many applications, the bias power supply 106 provides 12V-15V. The voltage supplied by the bootstrap capacitor augments the internal supply voltage (Vs) to activate the high-side switching device 102.

In the depicted embodiment, the bootstrap half-bridge driver circuit 100 utilizes a bootstrap diode 110, which is a superfast reverse recovery diode with a low forward voltage drop. The bootstrap diode 110 has a typical reverse recovery time between 10-100 nanoseconds, or more particularly between 50-75 nanoseconds, and in a specific embodiment the bootstrap diode 110 has a maximum reverse recovery time of about 75 nanoseconds. In addition, the bootstrap diode 110 has a forward voltage drop between 1.4-1.9 V, or more particularly between 1.6-1.9 V, and in a specific embodiment, the bootstrap diode 110 has a forward voltage drop of about 1.6 V at 125° C. ambient temperature. Further, in this or another embodiment, a bootstrap resistor 112 may be implemented to limit the charging current to the bootstrap capacitor 104 and also to limit the reverse recovery peak current of the bootstrap diode 110. The bootstrap resistor 112 can have a resistance in the range of 0-2 ohms, or more particularly between 0.5-1.5 ohms, and in a specific embodiment, the bootstrap resistor 112 has a resistance of about 1 ohms.

In the circuit depicted in FIG. 1, the high-side switching device 102 and the low-side switching device 108 are depicted as field-effect transistors (FETs), but in other embodiments the high-side switching device 102 and low-side switching device 108 can take the form of other conventionally available switching devices, such as insulated-gate bipolar transistor (IGBTs), GaN transistors, and silicon carbide MOSFETs (SiC MOSFETs), or combinations thereof.

Operation of the bootstrap half-bridge driver circuit 100 is controlled by a driver integrated circuit chip 114 capable of providing a first driving signal from the DRV_A pin controlling the high-side switching device 102 and a second driving signal from the DRV_B pin controlling the low-side switching device 108. In particular, when the low-side switching device 108 is turned on, either for a predetermined interval or through several switching cycles, a charging current ($i_{CH1}$) flows through the charging current flowpath 116 to charge the bootstrap capacitor 104 as discussed in more detail in FIG. 3. When the bootstrap capacitor 104 is sufficiently charged, the high-side switching device 102 is turned on using the charge on the bootstrap capacitor 104 and the internal voltage supply (Vs). Thereafter, the high-side switching device 102 and the low-side switching device 108 are alternately activated to provide the positive and negative switching cycles to start an attached power converter. in this illustrative example, the charging current flowpath 116 proceeds from the bias power supply 106, through the bootstrap resistor 112 and the bootstrap diode 110 to the bootstrap capacitor 104, then to the low-side switching device 108 and back to the bias power supply 106 through the GND pin of the driver IC chip 114.

While a half-bridge power converter is simple and low-cost, due mainly to the use of single half bridge driver chip, and only two (2) power switching devices, operation of conventional half-bridge power converters results in an unavoidable discharge of current during the charging of the bootstrap capacitor. As a consequence, a voltage imbalance is produced which manifests as a peak voltage stress applied to secondary side devices, which will be discussed in more detail in FIG. 3. Simply for comparison and context, a brief discussion of a full-bridge power converter is provided in FIG. 2 that follows.

Figure 2:
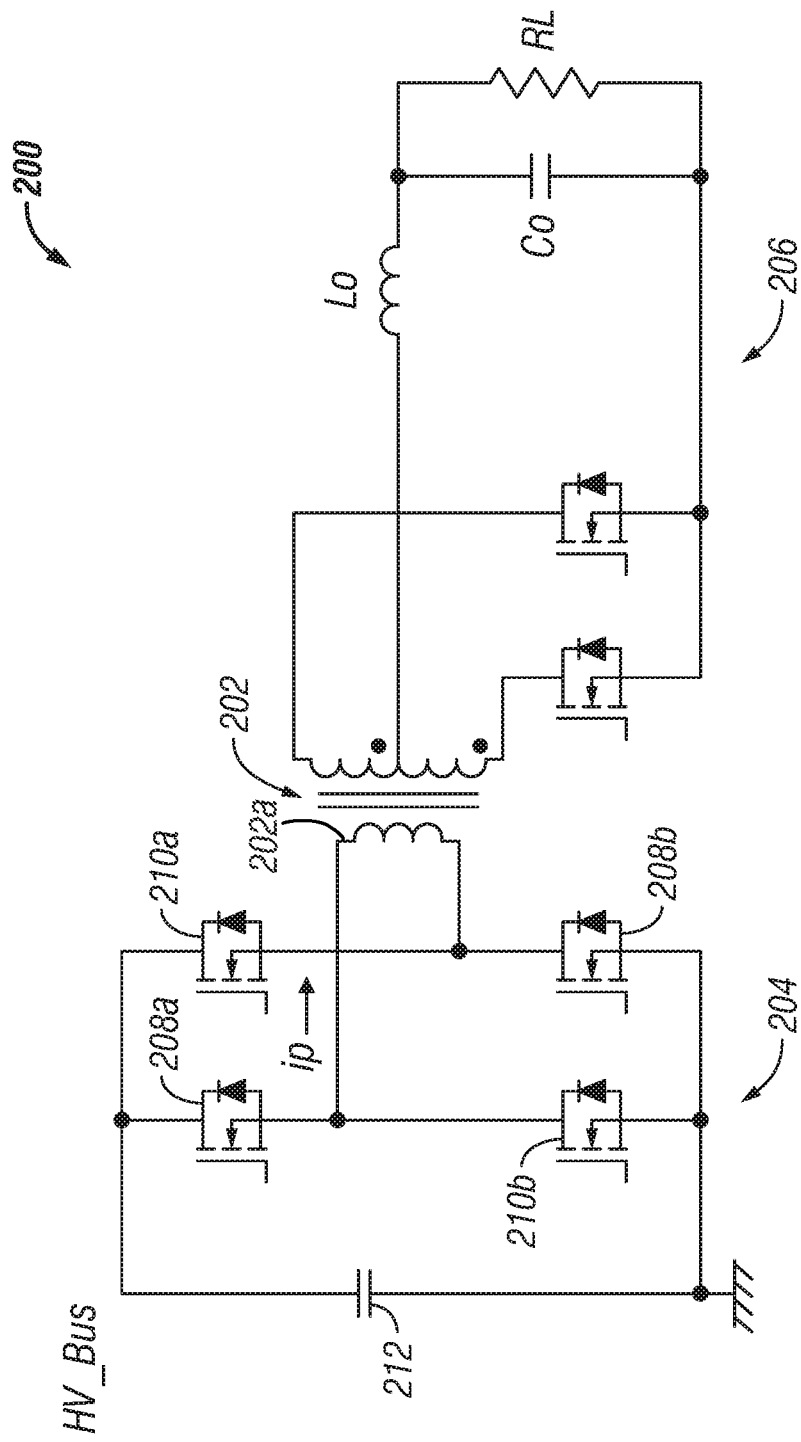
FIG. 2 is a partial schematic diagram of a conventional full-bridge power converter utilizing a center-tapped transformer and synchronous rectification devices.

FIG. 2 is a partial schematic diagram of a conventional full-bridge power converter utilizing a transformer, four (4) power switching devices, a pair of synchronous rectification devices on the secondary side, and two half bridge drivers (omitted for simplicity). The full-bridge converter 200, also referred to as an "H-bridge" power converter, includes a center-tapped transformer 202 that divides the circuit into a primary side 204 and a secondary side 206.

Although not depicted, the full-bridge power converter 200 is controlled by two half-bridge bootstrap driver circuits, each of which control a diagonal pair of switching devices (i.e., 208a and 208b, or 210a and 210b) by alternately activating the pairs of switching devices during startup. Each of the half-bridge drivers have a bootstrap capacitor arranged as depicted in FIG. 1. The first half-bridge driver circuit activates a corresponding low-side switching device to charge the bootstrap capacitor of the second half-bridge driver circuit. Likewise, the second half-bridge driver circuit activates the other low-side switching device to charge the bootstrap capacitor of the first half-bridge driver circuit. Importantly, a main current (ip) flows through a primary winding 202a of the transformer 202 only when both switching devices of a pair are conducting. During startup when the bootstrap capacitors of the half-bridge driver circuits are charging, the high-side switching devices 208a and 210a lack sufficient driving power and cannot be activated until after the bootstrap capacitors are sufficiently charged.

After a number of switching cycles, conduction of the low-side switching devices 208b and 210b has charged up both bootstrap capacitors, which can help activate the high-side switching devices 208a and 210a to start the full-bridge power converter 200. Because the main current (ip) cannot flow during the charging of the bootstrap capacitors, and more importantly, because the full-bridge power converter 200 only utilizes one capacitor bank 212 across HV_Bus and ground, a capacitor voltage imbalance will never arise. In contrast with the full-bridge power converter 200 of FIG. 2, the conventional half-bridge power converter experiences an undesirable voltage imbalance as described in more detail in FIG. 3 below.

Figure 3:
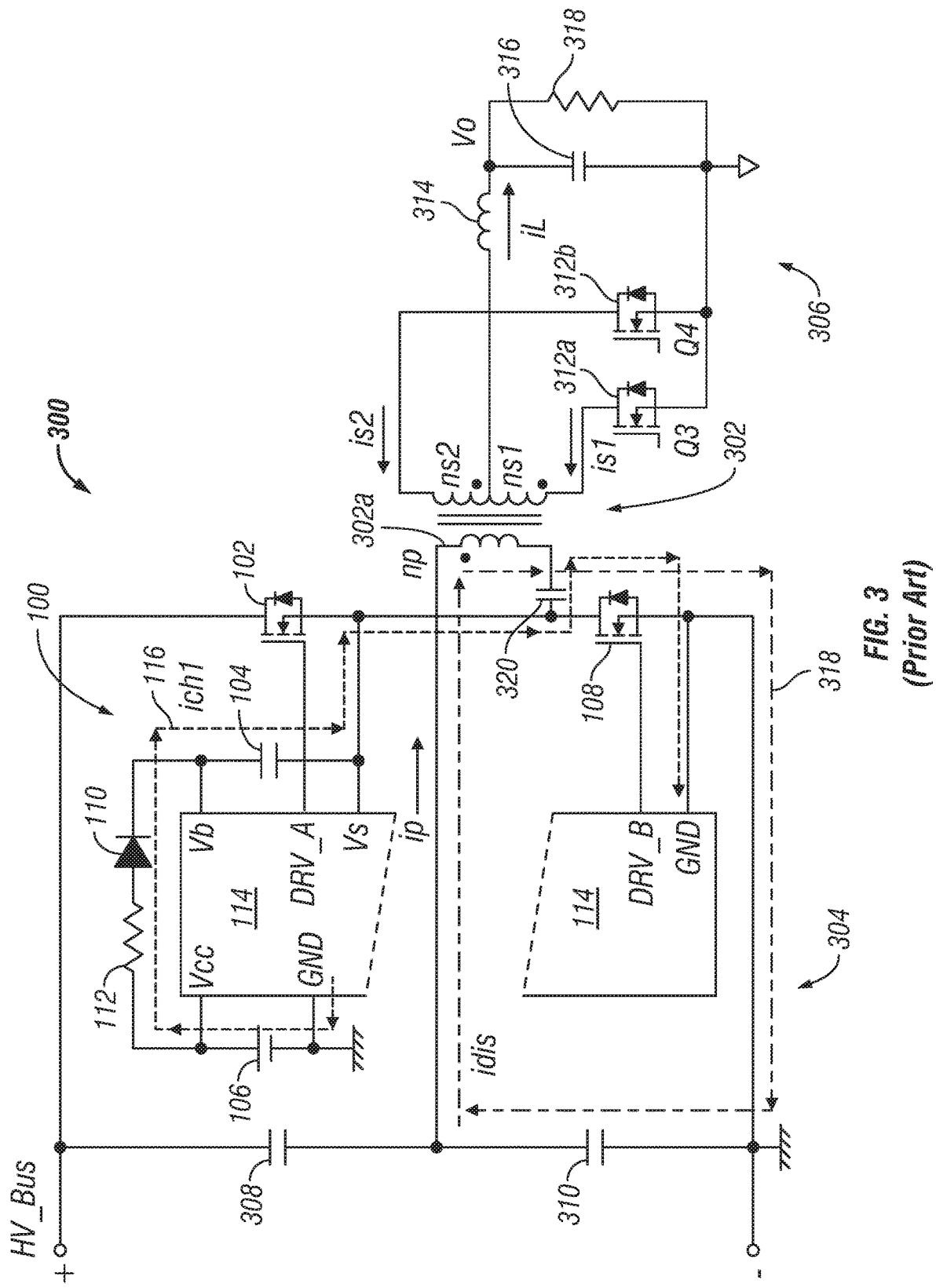
FIG. 3 is a schematic diagram of a conventional half-bridge power converter utilizing a center-tapped transformer and synchronous rectification devices with a bootstrap half-bridge driver circuit.

FIG. 3 is a schematic diagram of a conventional half-bridge power converter using a bootstrap half-bridge driver circuit 100. The conventional (DC-DC) half-bridge power converter 300 includes a transformer 302, implemented as a center-trapped transformer in this embodiment, which divides the circuit into a primary side 304 and a secondary side 306. The bootstrap half-bridge driver circuit 200 is disposed on the primary side 304. Also on the primary side 304 a first capacitor bank 308 in series with a second capacitor bank 310 located between a high voltage bus (HV_Bus) and primary ground.

In a non-limiting embodiment, the first capacitor bank 308 is a set of capacitors with an equivalent capacitance between 0.22-3.3 microfarads depending on the half bridge operation switching frequency, or more particularly between 0.47-1 microfarads, and in a specific embodiment, the first capacitor bank 308 has a capacitance of about 0.66 microfarads. The second capacitor bank 310 is a set of capacitors that has an equivalent capacitance that is approximately equal to the capacitance of the first capacitor bank 308. Additionally, in some embodiments, HV_Bus carries between +375V to +410V, or between +380V to +390V. In a particular embodiment HV_Bus carries about +385V.

On the secondary side 306 is a set of rectification devices 312. As used herein, the term "set" means one or more. Thus, a set of rectification devices 312 can be a single rectification device or two or more rectification devices. In this exemplary figure, the set of rectification devices 312 is two synchronous rectification devices 312a and 312b. Further, the non-limiting example of FIG. 3 depicts the set of rectification devices 312 as FETs; however, the set of rectification devices 312 may also be implemented as one or more rectification diodes or Schottky diodes or GaN switching devices.

Also, on the secondary side 306 is an output filter inductor 314 and an output filter and energy storage capacitor 316 providing an output voltage (Vo) that differs from an input voltage (i.e., HV_Bus). In this illustrative example, power generated by the half-bridge power converter 300 is delivered to a resistive load 318, which can be a located externally from the power converter. In a non-limiting embodiment, the resistive load 318 is subsystem of an apparatus, such as subsystem 1104 of apparatus 1100 in FIG. 11.

When the bootstrap technique is used with the half bridge power converter 300 to charge the bootstrap capacitor 104, the IC chip 114 sends a drive signal from the DRV_B pin to turn on low-side switching device 108. A charging current ($i_{ch1}$) traverses through the charging current flowpath 116 from the bias power supply 106 through the bootstrap resistor 112 and the bootstrap diode 110 to the bootstrap capacitor 104, then through the low-side switching device 108 and back to the bias power supply 106 via the GND pin of the IC chip 114, which is the same as primary ground. The charging current flowing through the charging current flowpath 116 charges the bootstrap capacitor 104.

When the low-side switching device 108 is conducting (i.e., turned on), the second capacitor bank 310 unavoidably discharges and sends a discharge current ($i_{dis}$) through the discharge current path 318 and through the primary winding 302a of the transformer 302. As the second capacitor bank 310 discharges, its impedance (and/or reactance) is reduced which causes a voltage imbalance between the first capacitor bank 308 and the second capacitor bank 310. Before the second capacitor bank 310 discharges the discharge current ($i_{dis}$), the HV_Bus voltage is divided equally between the first capacitor bank 308 and the second capacitor bank due to the same reactance (i.e., $Xc=1/(\omega c)$, where $\omega=2\pi f$) or impedance. However, as the second capacitor bank 310 discharges, the voltage of HV_Bus is no longer equally divided between the first capacitor bank 308 and the second capacitor bank 310. The voltage imbalance is illustrated in the exemplary waveform diagram of FIG. 4. Accordingly, the first capacitor bank 308 has a higher voltage across it relative to the second capacitor bank 310, which results in the transformer 302 being excited by asymmetrical power sources during the positive and the negative half-cycles. As a result, the positive half-cycle volt-second differs from the negative half-cycle volt-second, a DC offset is caused to the transformer 302, which can easily saturate the transformer 302. In some instances, unintentional differences in the signal pulse width from DRV_A and DRV_B may also cause asymmetrical excitation of the transformer 302, which could also result in saturation. To remedy such an effect, a DC-blocking capacitor 320 can be connected in series with the primary winding 302a of the transformer 302. The blocking capacitor 320 is located in series with the primary winding 302a of the transformer 302 and can have a capacitance in the range of 4.7-20 microfarads, or more particularly between 4.7-10 microfarads, and in a specific embodiment, the blocking capacitor 320 has a capacitance of about 10 microfarads. Further, in this or another embodiment, the blocking capacitor 320 should have a capacitance that is much greater than either the first capacitor bank 308 or the second capacitor bank 310. For example, the capacitance of the blocking capacitor 320 is between 10-20 times greater than the first capacitor bank 308 and the second capacitor bank 310, or more particularly between 12-18 times greater, and in a specific embodiment, the blocking capacitor 320 has a capacitance that is about 15 times greater than the first capacitor bank 308 and the second capacitor bank 310.

Theoretically, the blocking capacitor 320 can be omitted from the half-bridge power converter 300 if the capacitance of the first capacitor bank 308 (C1) is kept perfectly matched with the capacitance of the second capacitor bank 310 (C2), and both C1 and C2 are much larger than the capacitance of the bootstrap capacitor 104 (Cbs), i.e., C1=C2>>Cbs. As a result, the discharging time constant is still much greater than the pre-charging time constant, which would prevent the undesirable voltage imbalance across the first capacitor bank 308 and the second capacitor bank 310. However, the theoretical requirements can be impractical to achieve, so the blocking capacitor 320 can be used instead.

In other embodiments, the blocking capacitor 320 can be omitted from the half-bridge power converter 300 and replaced with a current mode controller to address the transformer saturation. However, because many current mode controllers, especially digital controllers, are unable to operate fast enough to be implemented in half-bridge power converters, and because the current mode controllers may not be able to prevent saturation during overload conditions and/or short-circuit conditions, the blocking capacitor 320 is preferred.

Figure 5:
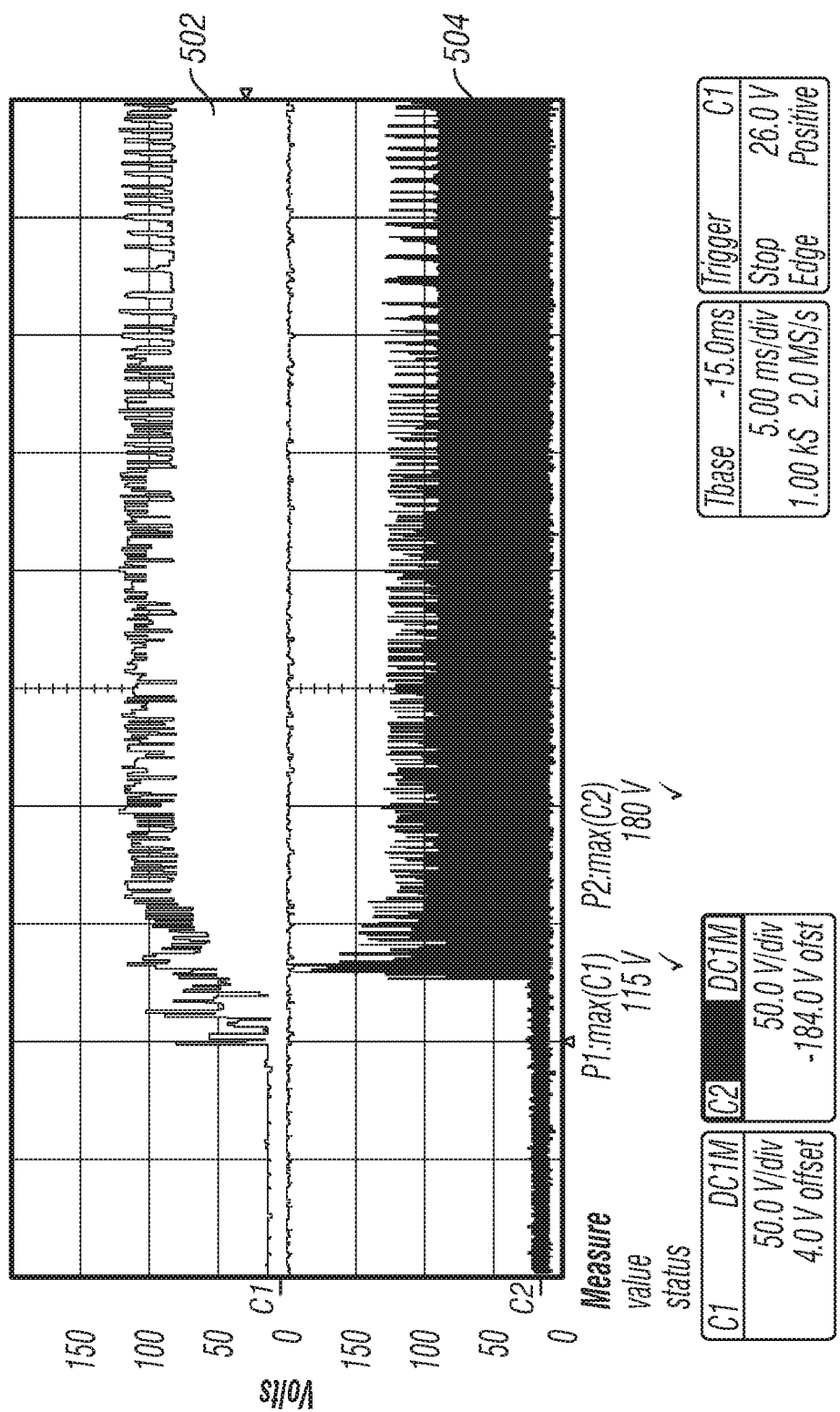
FIG. 5 is an exemplary waveform illustrating the effect of voltage imbalance on secondary-side rectification devices of conventional half-bridge power converters.

After a short, predetermined interval or several switching cycles, the bootstrap capacitor 104 is sufficiently charged to help activate the high-side switching device 102. When the high-side switching device 102 is finally turned on, a higher voltage stress is imparted upon one of the rectification devices 312. Specifically, a higher voltage stress is imparted upon synchronous rectification device 312b relative to synchronous rectification device 312a, as can be seen in FIG. 5. To accommodate this higher voltage stress, the rectification device 312b will need to be selected to have a higher voltage rating (e.g., 200V) as compared to the corresponding rectification device 312a (e.g., 150V), The higher voltage-rated device is accompanied by a higher ON-state resistance and a longer body diode reverse recovery time. As a result, power losses are increased and conversion efficiency is decreased.

Figure 4:
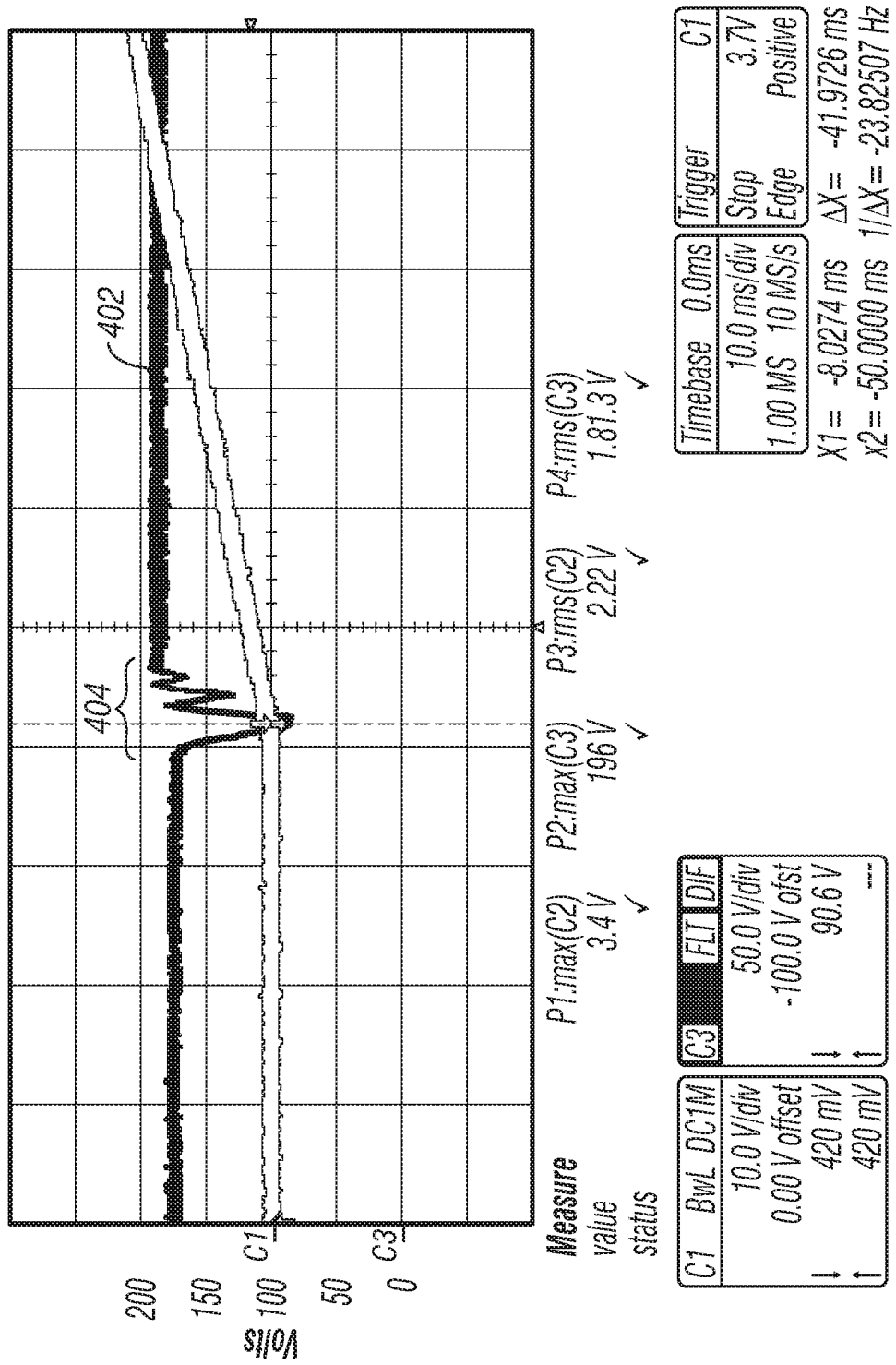
FIG. 4 is an exemplary waveform illustrating the voltage imbalance across the capacitor banks of a conventional half-bridge power converter.

FIG. 4 is an exemplary waveform illustrating the voltage imbalance across the capacitor banks of a conventional half-bridge power converter. In particular, waveform 402 depicts the voltage measurement of the second capacitor bank 310 of half-bridge power converter 300 before startup, during the startup interval 404, and after startup. The startup interval 404 of the half-bridge power converter 300 occurs after the bootstrap capacitor 104 has charged and the high-side switching device 102 and the low-side switching device 108 begin alternately switching to excite the transformer 302.

In the exemplary half-bridge power converter 300 from which the waveform of FIG. 4 is derived, the HV_Bus provides 385V. As can be seen in FIG. 3, the voltage of the HV_Bus is equally divided between the first capacitor bank 308 and the second capacitor bank 310 so that each has voltage of about 192.5V. During the startup interval 404, the voltage measured at the second capacitor bank 310 drops below 100V, which means that the voltage at the first capacitor bank 308 rises above 285V (385V at the HV_Bus minus 100V at the second capacitor bank 310). The 185V difference between the first capacitor bank 308 and the second capacitor bank 310 illustrates the undesirable voltage imbalance experienced by conventional half-bridge power converters 300 during startup.

After about 6 milliseconds, the oscillations cease and the voltage at the second capacitor bank 310 returns to about 192.5V. Similarly, the voltage at the first capacitor bank 308, although not depicted, also returns to about 192.5V.

FIG. 5 is an exemplary waveform illustrating the effect of voltage imbalance on rectification devices of conventional half-bridge power converters. The exemplary half-bridge power converter was configured with a 0.22 μF bootstrap capacitor, a 1Ω, bootstrap resistor, a 100Ω first pre-charging resistor, a 0.66 μF first capacitor bank, a 0.66 μF second capacitor bank, and a 10 μF blocking capacitor. In addition, the following operational parameters were selected: Vin=385 Vdc, Vo=28V, and Io=15 A.

Waveform 502 depicts the voltage measured across a rectification device corresponding with rectification device 312a in FIG. 3, and waveform 504 depicts the voltage measured across the rectification device corresponding with rectification device 312b in FIG. 3, Importantly, waveform 502 shows a maximum voltage of 115V and waveform 504 shows an initial voltage spike of 184V, which is a 69V voltage stress difference. As previously mentioned, to accommodate these operating conditions, two differently rated rectification devices should be selected: one 150V-rated rectification device and one 200V-rated rectification device.

Therefore, the novel aspects describe herein recognize the need for an improved half-bridge power converter having a novel pre-charging circuit and corresponding method that can charge a bootstrap capacitor while minimizing the discharge current escaping from one of the capacitor banks in the conventional half-bridge power converters, which also reduces the magnitude of voltage imbalance between the serially connected capacitor banks. Likewise, the peak voltage stress applied to the secondary side devices (e.g., either rectified diodes or synchronous rectification FETs) is reduced, which increases reliability and service life.

Figure 6:
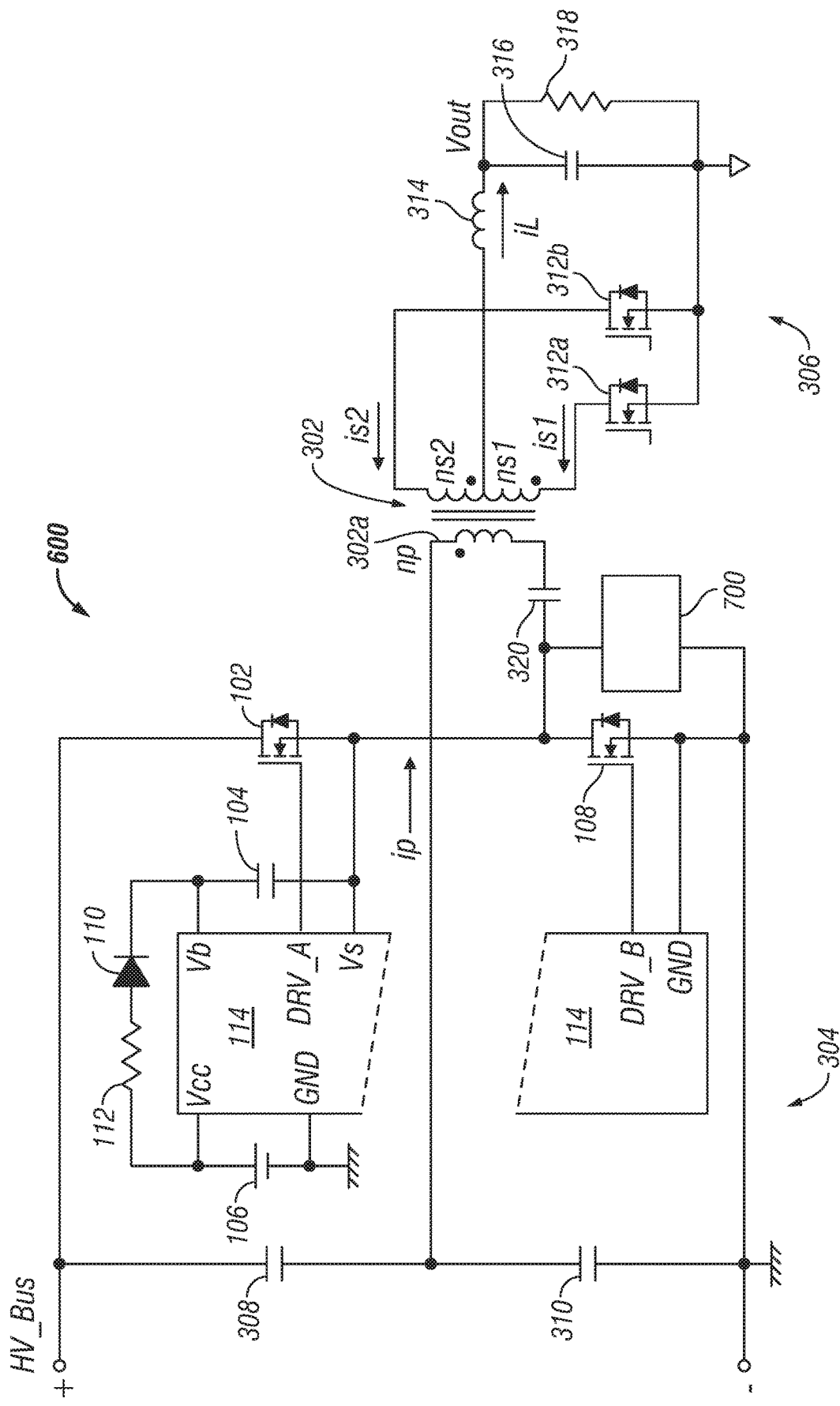
FIG. 6 is a schematic diagram of an improved half-bridge power converter in accordance with an illustrative embodiment.

FIG. 6 is a schematic diagram of an improved half-bridge power converter in accordance with an illustrative embodiment. The half-bridge power converter 600 is similar to the half-bridge power converter 300 in FIG. 3 but includes a pre-charging circuit 700 serially connected between the primary winding 302a of the transformer 302 and ground. At a high level, the pre-charging circuit 700 pre-charges the bootstrap capacitor 104 to allow the high-side switching device 102 to turn on while minimizing the voltage imbalance between the first capacitor bank 308 and the second capacitor bank 312. As a result, the pre-charging circuit 700 reduces the over-voltage stress experienced by the set of rectification devices 312 on the secondary side 306 of the half-bridge power converter 600. A more detailed discussion and an exemplary embodiment of the pre-charging circuit 700 is provided in the figures that follow.

Figure 7:
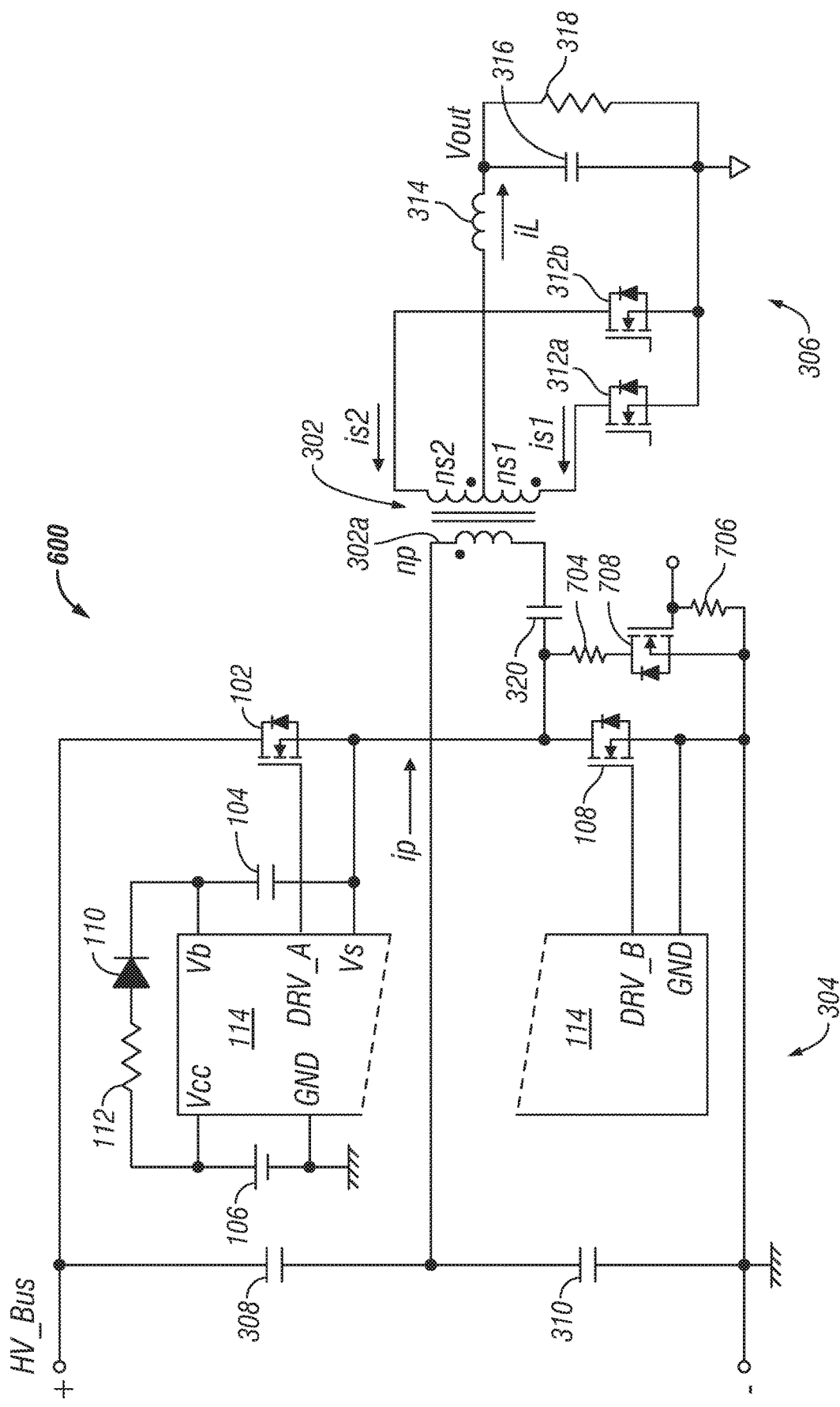
FIG. 7 is a schematic diagram of the improved half-bridge power converter that include an exemplary configuration of a pre-charging circuit in accordance with an illustrative embodiment.

FIG. 7 is a schematic diagram of the improved half-bridge power converter 600 which depicts an exemplary configuration of the pre-charging circuit 700 in accordance with an illustrative embodiment. The pre-charging circuit 700 includes a first pre-charge resistor 704, a gate pull-down resistor 706, a pre-charge switching device 708.

The pre-charge resistor 704, which is connected between the blocking capacitor 320 and the drain of the pre-charge switching device 708, limits the charging current of the bootstrap capacitor 104, and also reduces the discharging current originating from the second capacitor bank 310 when the pre-charge switching device 708 is turned on. The gate pull-down resistor 706 is a pull-down resistor is connected to the gate of the pre-charge switching device 708 and the primary ground, which prevents the pre-charge switching device 708 from inadvertently turning on, e.g., by noise or when the gate-control signal is floating (i.e., not high nor low, but in "tristate status").

In a non-limiting embodiment, the pre-charge resistor 704 has low resistance when compared to the gate pull-down resistor 706. For example, the pre-charge resistor 704 can have a resistance in the range of 50-200 ohms, or more particularly between 75-120 ohms, and in a specific embodiment, the pre-charge resistor 704 has a resistance of about 100 ohms. The gate pull-down resistor 706 has a relatively higher resistance than the pre-charge resistor 704. For example, the gate pull-down resistor 706 can have a resistance in the range of 10-100 kilo-ohms, or more particularly between 10-50 kilo-ohms, and in a specific embodiment, the gate pull down resistor 706 has a resistance of about 10 kilo-ohms. In this or another embodiment, the pre-charge switching device 708 is a high-voltage, low-current rated N-channel MOSFET. In a specific embodiment, the pre-charge switching device 708 has a SOT-23 package with voltage rating of 600V, current rating of 0.021 A, drain-source ON-state resistance of 350 ohms, and gate threshold voltage Vgs_th of 1.4 to 2.6V (typical 2V), that can be directly driven by a digital controller chip output without using any driver and/or interfacing circuit.

Figure 8:
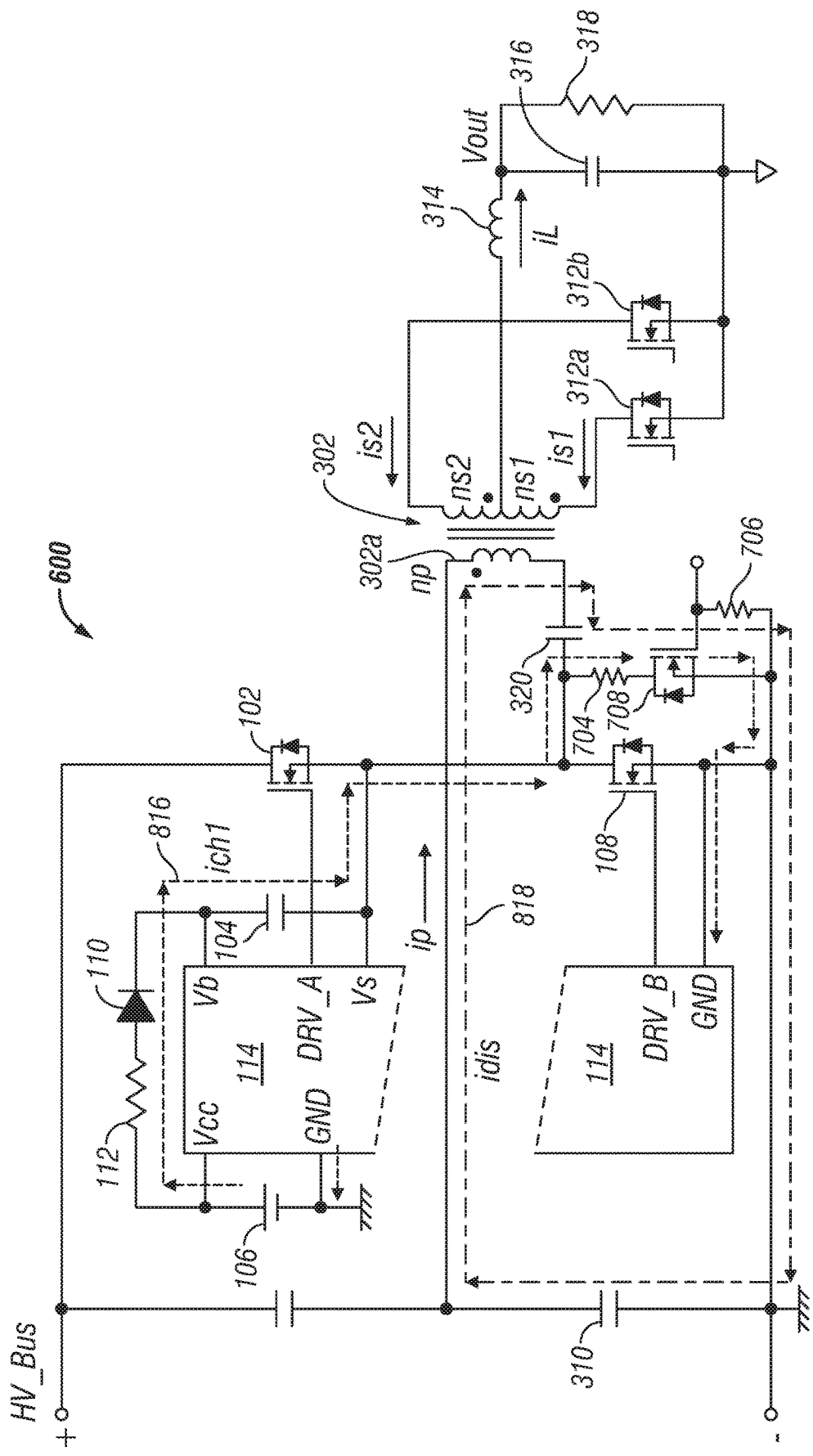
FIG. 8 is a schematic diagram depicting charging and discharging current flowpaths through the improved half-bridge power converter in accordance with an illustrative embodiment.

FIG. 8 is a schematic diagram depicting charging and discharging current flowpaths through the improved half-bridge power converter in accordance with an illustrative embodiment. The charging current flowpath 816 proceeds from the bias power supply 106 through the bootstrap resistor 112 and the bootstrap diode 110 to charge the bootstrap capacitor 104. Thereafter, the charging current flowpath 816 proceeds through the pre-charge resistor 704, through the pre-charge switching device 708, and back to the bias power supply 106 through the GND pin of the driver IC chip 114.

The discharge current flowpath 818 proceeds from the second capacitor bank 310 and through the primary winding 302a of the center-tapped transformer 302, and through the DC blocking capacitor 320, and then the pre-charge resistor 704, the pre-charge switching device 708, and finally returning to the second capacitor bank 310 through ground.

Figure 9:
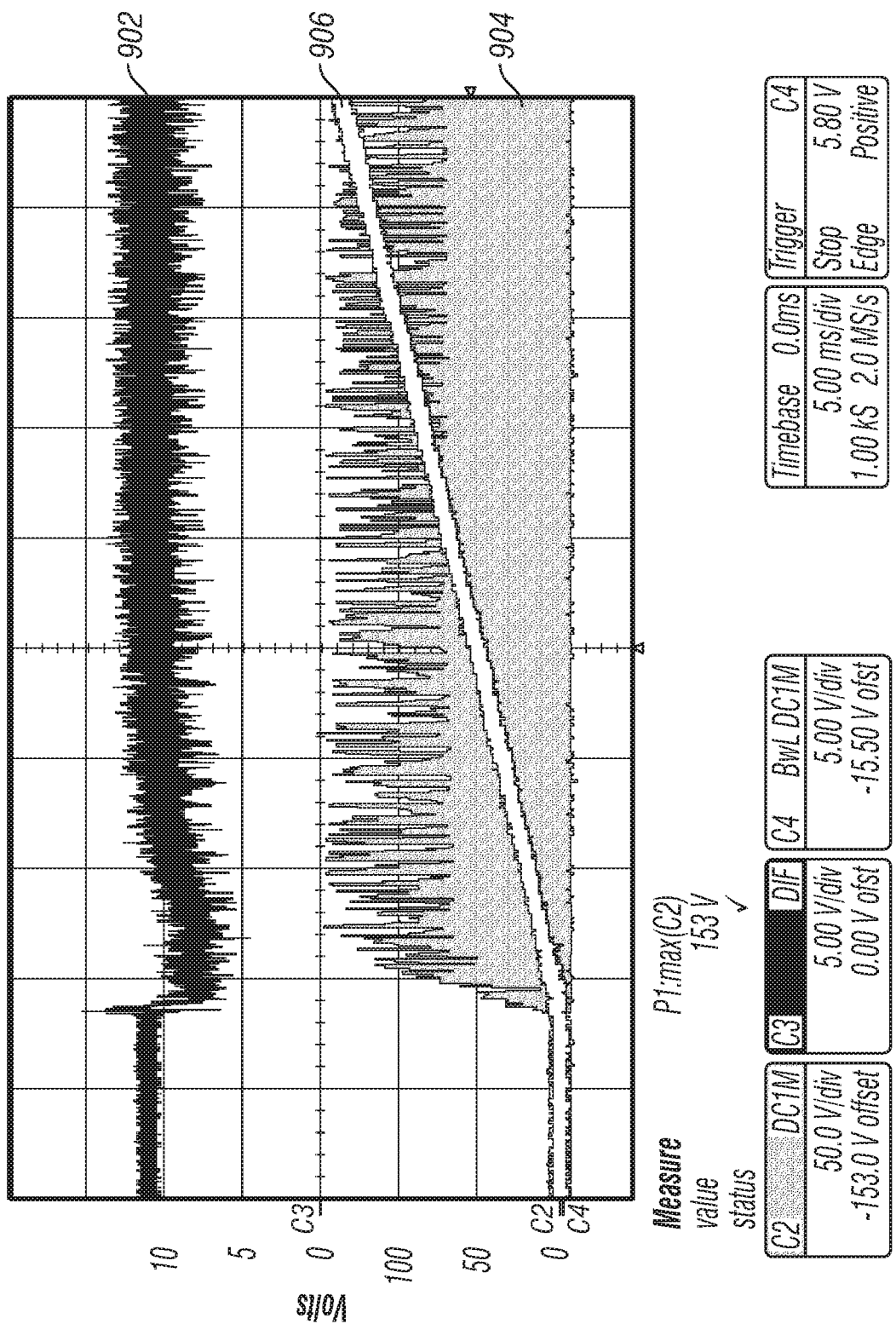
FIG. 9 is an exemplary startup waveform illustrating the effectiveness of the pre-charging circuit on reducing the over-voltage stress experienced by the secondary-side rectification device(s).

FIG. 9 is an exemplary startup waveform illustrating g the effectiveness of the pre-charging circuit on reducing the over-voltage stress experienced by the secondary side rectification device(s). The exemplary half-bridge power converter was configured as shown in FIG. 3 with a 0.22 µF bootstrap capacitor, a 1Ω bootstrap resistor, a 100Ω pre-charging resistor, a 0.66 µF first capacitor bank, a 0.66 µF second capacitor bank, and a 10 µF blocking capacitor. In addition, the following operational parameters were selected: Vin=385 Vdc, Vo=28V, and Io=15 A.

Waveform 902 depicts the voltage measured across the bootstrap capacitor 104 and waveform 904 depicts the voltage measured across the rectification device corresponding with rectification device 312b in FIG. 7. Waveform 906 is the output voltage (Vo) measured across the output capacitor 316, which depicts a slowly rising voltage consistent with a half-bridge power converter providing power via a soft start process.

As can be seen from waveform 902, the bootstrap capacitor 102 is fully charged to about 12V during the charging interval duration by activating the pre-charge switching device 708 as shown in FIG. 8. The charging interval duration is a period of time that allows the bootstrap capacitor 104, with a representative capacitance of Cbs, to be fully charged. For example, the charging interval duration can be a time between 200-500 µs, or between 250-475 µs, and in a more particular embodiment the charging interval duration is a time of about 380 µs. In this or another embodiment, the charging interval duration is about 3-5 times the RC time constant calculated from the capacitance of bootstrap capacitor 104 (Cbs) and the sum of the resistances of the pre-charge resistor 704 (R1), the pre-charge switching device drain-source resistance (Rds_on) of the pre-charge switching device 708, and the bootstrap resistor 112 (Rbs), i.e., 3τ, 4τ, or 5τ, where τ=RC=((Rbs+R1+Rds_on)=Cbs). For example, if Cbs=0.22 µF, Rbs=1Ω, R1=100Ω, and Rds_on=330Ω, then the time constant will be around 95 µs, and the charging time interval should be between 285-475 µs.

After the charging interval duration, the pre-charge switching device 708 is deactivated and maintained in the OFF state, during which time the bootstrap capacitor 108 will discharge or leak some of the charged energy through the driver IC chip 114 due to the finite internal impedance of the driver IC chip 114. The leakage is depicted in waveform 902 by the decrease in voltage from 12V to about 7V. Accordingly, the high-side switching device 102 and the low-side switching device 108 should be activated after a relatively short transition delay. In one embodiment, for optimal efficiency and reduced power loss, the transition delay should be at most between 10-30 microseconds, or more particularly between 15-25 microseconds, and in a specific embodiment the transition delay is at most about 20 microseconds. in this or another embodiment, the transition delay should be smaller than the prospective discharge time constant calculated by Ric×Cbs, where Ric is the internal impedance of the driver IC chip 114 and Cbs is the capacitance of the bootstrap capacitor 104.

Despite the preferred charging interval duration and the transition delay identified above, the waveforms depicted in FIG. 9 were generated using a charging interval duration and transition delay that exceeded the preferred ranges. For example, the duration of the charging interval was selected to be 8 milliseconds and the transition delay was selected to be about 500 microseconds, both of which exceed the preferred time periods previously indicated. The increased delays were necessitated by the type hardware utilized in the exemplary half-bridge power converter 600 from which the waveforms in FIG. 9 were measured. In particular, the half-bridge power converter 600 utilized a primary-side controller(not shown) that coordinated the activation and de-activation of the pre-charging switching device and the high-side/low-side switching devices of the half-bridge converter. During operation, the primary-side controller first executes a handshake protocol with a secondary-side controller (also now shown) via universal asynchronous receiver-transmitter (UART) and digital isolators, which introduces additional time delays. In a non-limiting embodiment, the increased time delays can be eliminated by the use of a digital isolator and corresponding driver to allow the secondary-side controller to coordinate all the control sequence and timing of the pre-charging switching device and the high-side/low-side switching devices of the half-bridge converter and the secondary-side rectification devices of the half-bridge converter in a manner known to one having ordinary skill in the art. Regardless, the waveforms depicted in FIG. 9 demonstrate the effectiveness of the pre-charging circuit 700 in reducing voltage imbalances and maximum voltage stress on secondary-side devices under non-ideal operating conditions or parameters (i.e., in the presence of an increased charging interval and increased transition delay). As can be seen, waveform 904 shows that the maximum voltage stress experienced at the rectification device 312b is 153V. In contrast, a conventional half-bridge power converter experiences a maximum voltage stress of about 180V at the same rectification device, as was seen in FIG. 5. If the charging interval duration and the transition delay were selected to fall within the preferred time periods disclosed above, the voltage imbalance between the first capacitor bank 308 and the second capacitor bank 310 would be significantly less, resulting in a considerably lower maximum voltage stress on secondary-side devices. Therefore, the pre-charging circuit results in a reduction of at least 15% in the maximum voltage stress.

The improved half-bridge power converters described herein can utilize 150V-rated devices for both the rectification devices 312; whereas the conventional half-bridge power converters would require a 150V-rated device for the rectification device 312a and a 200V-rated device for rectification device 312b that experiences the higher voltage stress.

Figure 10:
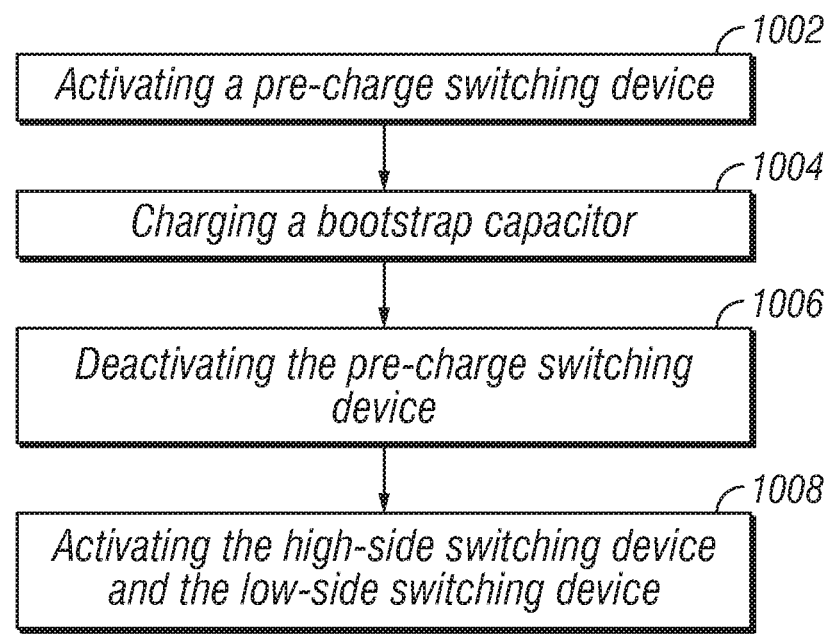
FIG. 10 is a flowchart of a process for starting a half-bridge power converter in accordance with an illustrative embodiment.

FIG. 10 is a flowchart of a process for starting up a half-bridge power converter in accordance with an illustrative embodiment. The exemplary process of FIG. 10 can be implemented in a novel half-bridge power converter, such as half-bridge power converter 600 shown in FIGS. 6-8. In a first step, a pre-charge switching device is activated (Step 1002). The pre-charge switching device can be activated by a pre-charge signal line connected to its gate and set to "high" (e.g., 1). In a non-limiting embodiment, the pre-charge signal is enabled for a charging interval.

A charging current is then supplied over the charging current flowpath to charge the bootstrap capacitor (Step 1004). The charging current is supplied as long as the pre-charge switching device is turned on; thus, in a non-limiting embodiment the charging current is supplied for the duration of the previously defined charging interval. Additionally, as the bootstrap capacitor is charging, the second capacitor bank 310 unavoidably discharges through the discharge current flowpath 818. However, because the capacitance of the DC blocking capacitor 320 (Cb) is much larger than the capacitance of the second capacitor bank 310 (C2), i.e., Cb>>C2, and also much greater than the capacitance of bootstrap capacitor 104 (Cbs), i.e., Cb>>Cbs, the discharging time constant of ((R1+Rds_on)×(C2+Cb)) is much larger than the pre-charging time constant ((R1+Rds_on+Rbs)×Cbs). Because the discharging time constant is much larger than the pre-charging time constant, during the bootstrap capacitor pre-charging interval, the second capacitor bank 310 discharges relatively little energy as the bootstrap capacitor 104 is charging, which is due to the much larger time discharging time constant of ((R1+Rds-on)×(C2+Cb)). As a result, the voltage imbalance on the half-bridge bulk capacitor banks is significantly reduced.

After the charging interval, the pre-charge switching device is deactivated (Step 1006). In a non-limiting embodiment, the pre-charge switching device is deactivated by a controller setting the pre-charge signal line to "low" (e.g., 0), which stops the bootstrap capacitor from charging and also stops the discharge from the second capacitor bank. The pre-charge switching device is disabled and maintained inactive as long as the high-side and low-side switching devices are switching. When the pre-charge switching device is activated, the high-side switching device and low-side switching device are inactive; likewise, when the high-side switching device and the low-side switching device are active, the pre-charge switching device is inactive.

After a transition delay, the low-side and the high-side switching devices are alternately activated (Step 1008), As previously mentioned, in some embodiments the low-side and the high-side switching devices are activated after a short transition delay, such as a time that is at most between 10-30 μs, or more particularly between 15-20 μs. The transition delay should be smaller than the prospective discharge time constant calculated by Ric×Cbs, where Ric is the internal impedance of the driver IC chip. In the event that the Ric is not sufficiently large, then the capacitance of the bootstrap capacitor 104 (Cbs) should be increased. Likewise, the capacitance of the blocking capacitor 320 (Cb) should also be increased to satisfy the condition that Cb>>Cbs.

Sometime after step 1008, the output voltage of the half-bridge power converter can be provided. In some embodiments, the output voltage is delivered gradually to provide a soft start.

Figure 11:
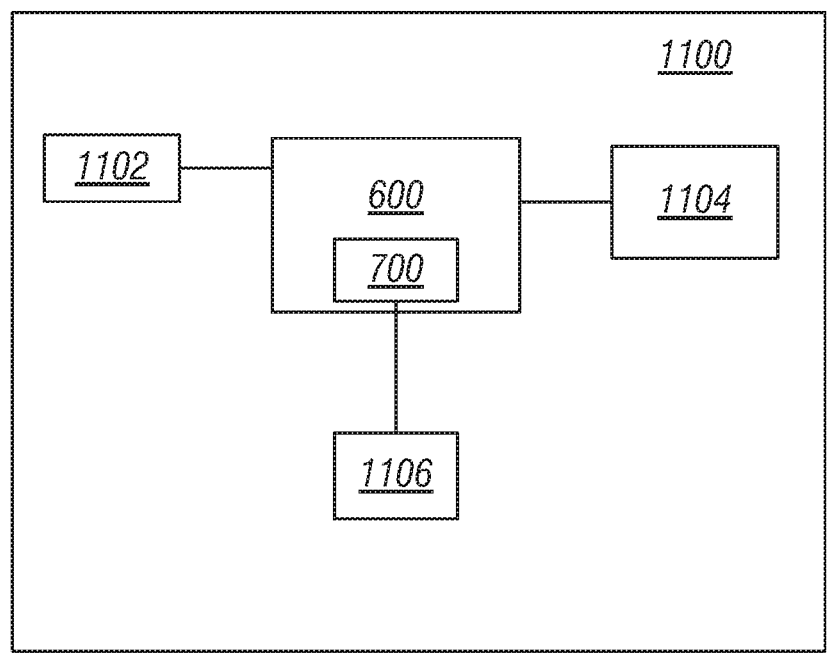
FIG. 11 is a simplified diagram of an apparatus implementing the improved half-bridge power converter in accordance with an illustrative embodiment.

FIG. 11 is a simplified diagram of an apparatus implementing the improved half-bridge power converter in accordance with an illustrative embodiment. The apparatus 1100 is an electronic device powered by a power supply 1102. Non-limiting examples of the apparatus 1100 include an LED/LCD display, a vehicle charger, a telecommunication device, data communication equipment, a base-station and/or wireless equipment, semiconductor test equipment, factory automation equipment, robotic equipment, and transportation equipment. The apparatus 1100 may have a set of subsystems 1104 operating at a predetermined power level that differs from the power level supplied by the power supply 1102. Accordingly, the apparatus 1100 includes a half-bridge power converter 600 with a pre-charging circuit 700 to convert the supplied power to a predetermined level required by the set of subsystems 1104 electrically coupled with the half-bridge power converter 600. The one or more subsystems 1104 can be connected to the power converter 600 to receive the output voltage (Vo), and in some embodiments, the one or more subsystems 1104 is represented by the resistive load 318 in FIGS. 6-8.

Apparatus 1100 also includes a controller 1106 that is at least connected to the pre-charging circuit 700 of the half-bridge power converter 600 to control the pre-charge signal line that activates and deactivates the pre-charge switching device 708 via the gate. In this illustrative embodiment, the controller 1106 is depicted separately from the half-bridge power converter 600; however, in another embodiment the controller 1106 may be integrated as a component of the half-bridge power converter 600.

ADDITIONAL EMBODIMENTS

The following descriptive embodiments are offered in further support of the disclosed invention:

In a first embodiment, novel aspects of the present disclosure are directed to a half-bridge power converter comprising: a transformer dividing the half-bridge power converter into a primary side and a secondary side; a first capacitor bank and a second capacitor bank in series with the first capacitor bank, wherein the first capacitor bank and the second capacitor bank are located on the primary side; a bootstrap capacitor on the primary side, wherein the bootstrap capacitor is configured to be charged by current flowing through a charging current flowpath that extends at least through a pre-charging circuit configured to reduce a voltage imbalance between the first capacitor bank and the second capacitor bank; and a discharging current flowpath that extends at least through a primary winding of the transformer and the pre-charging circuit.

In another aspect of the first embodiment, the half-bridge power converter comprises: a transformer dividing the half-bridge power converter into a primary side and a secondary side; a first capacitor bank and a second capacitor bank in series with the first capacitor bank, wherein the first capacitor bank and the second capacitor bank are located on the primary side; a bootstrap capacitor on the primary side, wherein the bootstrap capacitor is configured to be charged by current flowing through a charging current flowpath that extends at least through a pre-charging circuit configured to reduce a voltage imbalance between the first capacitor bank and the second capacitor bank; and a discharging current flowpath that extends at least through a primary winding of the transformer and the pre-charging circuit; and wherein the half-bridge power converter further comprising one or more limitations selected from the following list:

wherein the charging current flowpath passes through the bootstrap capacitor;

wherein the charging current flowpath passes through a bootstrap resistor and a bootstrap diode;

wherein the half-bridge power converter further comprises a blocking capacitor connected between a primary winding of the transformer and the pre-charging circuit;

wherein the blocking capacitor has a higher capacitance than the first capacitor bank and the second capacitor bank, and wherein the blocking capacitor has a higher capacitance than the bootstrap capacitor;

wherein the pre-charging circuit further comprises: a pre-charge resistor in series with a primary winding of the transformer; and a pre-charge switching device connected to the first pre-charge resistor;

wherein the pre-charge switching device is an N-channel MOSFET, and wherein the first pre-charge resistor is connected to a drain of the N-channel MOSFET;

wherein the pre-charging circuit further comprises: a gate pull-down resistor connected between a gate of the N-channel MOSFET and the primary ground;

wherein the half-bridge power converter further comprises: a high-side switching device; a low-side switching device; and a driver IC chip connected to the high-side switching device and the low side switching device to control a set of switching cycles of the half-bridge power converter; wherein the pre-charging circuit is located in parallel with the low-side switching device; and wherein the half-bridge power converter further comprises: a pair of synchronous rectification devices disposed on the secondary side of the of the half-bridge power converter, wherein each of the pair of synchronous rectification devices has an equal power rating.

In a second embodiment, novel aspects of the present disclosure are directed to an apparatus comprising a power supply providing a first power level; a half-bridge power converter electrically coupled to the power supply, wherein the half-bridge power converter includes a first capacitor bank and a second capacitor bank; a resistive load connected to the half-bridge power converter, wherein the half-bridge power converter provides the resistive load with a second power level that differs from the first power level; and wherein the half-bridge power converter further comprises a pre-charging circuit configured to reduce a voltage imbalance between the first capacitor bank and the second capacitor bank.

In another aspect of the second embodiment, the apparatus comprises: a power supply providing a first power level; half-bridge power converter electrically coupled to the power supply, wherein the half-bridge power converter includes a first capacitor bank and a second capacitor bank; a resistive load connected to the half-bridge power converter, wherein the half-bridge power converter provides the resistive load with a second power level that differs from the first power level; and wherein the half-bridge power converter further comprises a pre-charging circuit configured to reduce a voltage imbalance between the first capacitor bank and the second capacitor bank; and wherein the apparatus further comprising one or more limitations selected from the following list:

wherein the half-bridge power converter further comprises: a transformer dividing the half-bridge power converter o a primary side and a secondary side; a first capacitor bank and a second capacitor bank in series with the first capacitor bank, wherein the first capacitor bank and the second capacitor bank are located on the primary side; a bootstrap capacitor on the primary side, wherein the bootstrap capacitor is configured to be charged by current flowing through a charging current flowpath that extends at least through a pre-charging circuit configured to reduce a voltage imbalance between the first capacitor bank and the second capacitor bank; and a discharging current flowpath that extends at least through a primary winding of the transformer and the pre-charging circuit;

wherein the charging current flowpath passes through the bootstrap capacitor;

wherein the charging current flowpath passes through a bootstrap resistor and a bootstrap diode;

wherein the half-bridge power converter further comprises a blocking capacitor connected between a primary winding of the transformer and the pre-charging circuit;

wherein the blocking capacitor has a higher capacitance than the first capacitor bank and the second capacitor bank, and wherein the blocking capacitor has a higher capacitance than the bootstrap capacitor;

wherein the pre-charging circuit further comprises: a pre-charge resistor in series with a primary winding of the transformer; and a pre-charge switching device connected to the pre-charge resistor;

wherein the pre-charge switching device is an N-channel MOSFET, and wherein the pre-charge resistor is connected to a drain of the N-channel MOSFET;

wherein the pre-charging circuit further comprises: a gate pull-down resistor connected between a gate of the N-channel MOSFET and primary ground;

wherein the half-bridge power converter further comprises: a high-side switching device; a low-side switching device; and a driver IC chip connected to the high-side switching device and the low side switching device to control a set of switching cycles of the half-bridge power converter; wherein the pre-charging circuit is located in parallel with the low-side switching device; and wherein the half-bridge power converter further comprises: a pair of synchronous rectification devices disposed on the secondary side of the of the half-bridge power converter, wherein each of the pair of synchronous rectification devices has an equal power rating.

In a third embodiment, novel aspects of the present disclosure are directed to a method for starting a half-bridge power converter, the method comprising: activating a pre-charge switching device for a charging interval duration; supplying a current through a charging current flowpath for the charging interval duration to charge a bootstrap capacitor; deactivating the pre-charge switching device after the charging interval duration; and alternately activating a high-side switching device and a low-side switching device, wherein the high-side switching device is activated a least in part using the charge on the bootstrap voltage.

In another aspect of the third embodiment, the method comprises: activating a pre-charge switching device for a charging interval duration; supplying a current through a charging current flowpath for the charging interval duration to charge a bootstrap capacitor; deactivating the pre-charge switching device after the charging interval duration; and alternately activating a high-side switching device and a low-side switching device, wherein the high-side switching device is activated a least in part using the charge on the bootstrap voltage; and wherein the method further comprising one or more limitations selected from the following list:

delaying for a time-delay interval before the step of alternately activating the high-side switching device and the low-side switching device;

wherein the current supplied through the charging current flowpath charges a bootstrap capacitor in the charging current flowpath; and wherein the method further comprises: discharging a second capacitor bank through a discharging current flowpath for the charging interval duration, wherein the discharging current flowpath passes through the pre-charge switching device.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A half-bridge power converter comprising:
   a transformer dividing the half-bridge power converter into a primary side and a secondary side;
   a first capacitor bank and a second capacitor bank in series with the first capacitor bank, wherein the first capacitor bank and the second capacitor bank are located on the primary side;
   a bootstrap capacitor on the primary side, wherein the bootstrap capacitor is configured to be charged by current flowing through a charging current flowpath that extends at least through a pre-charging circuit located on the primary side, wherein the pre-charging circuit reduces a voltage imbalance between the first capacitor bank and the second capacitor bank; and
   a discharging current flowpath that extends at least through a primary winding of the transformer and the pre-charging circuit.

2. The half-bridge power converter of claim 1, wherein the charging current flowpath passes through the bootstrap capacitor.

3. The half-bridge power converter of claim 2, wherein the charging current flowpath passes through a bootstrap resistor and a bootstrap diode.

4. The half-bridge power converter of claim 1, further comprising a blocking capacitor connected between a primary winding of the transformer and the pre-charging circuit.

5. The half-bridge power converter of claim 4, wherein the blocking capacitor has a higher capacitance than the first capacitor bank and the second capacitor bank, and wherein the blocking capacitor has a higher capacitance than the bootstrap capacitor.

6. The half-bridge power converter of claim 1, wherein the pre-charging circuit further comprises:
   a pre-charge resistor in series with a primary winding of the transformer; and
   a pre-charge switching device connected to the pre-charge resistor.

7. The half-bridge power converter of claim 6, wherein the pre-charge switching device is an N-channel MOSFET, and wherein the pre-charge resistor is connected to a drain of the N-channel MOSFET.

8. The half-bridge power converter of claim 7, further comprising:
   a gate pull-down resistor connected between a gate of the N-channel MOSFET and a primary ground.

9. The half-bridge power converter of claim 1, further comprising:
   a high-side switching device;
   a low-side switching device; and
   a driver IC chip connected to the high-side switching device and the low side switching device to control a set of switching cycles of the half-bridge power converter;
   wherein the pre-charging circuit is located in parallel with the low-side switching device.

10. The half-bridge power converter of claim 1, further comprising:
    a pair of synchronous rectification devices disposed on the secondary side of the of the half-bridge power converter, wherein each of the pair of synchronous rectification devices has an equal power rating.

11. An apparatus comprising:
    a power supply providing a first power level;
    a half-bridge power converter electrically coupled to the power supply, wherein the half-bridge power converter includes:
      a transformer dividing the half-bridge power converter into a primary side and a secondary side;
      a first capacitor bank and a second capacitor bank in series with the first capacitor bank, wherein the first capacitor bank and the second capacitor bank are located on the primary side;
      a bootstrap capacitor on the primary side, wherein the bootstrap capacitor is configured to be charged by current flowing through a charging current flowpath that extends at least through a pre-charging circuit located on the primary side, wherein the pre-charging circuit reduces a voltage imbalance between the first capacitor bank and the second capacitor bank; and
      a discharging current flowpath that extends at least through a primary winding of the transformer and the pre-charging circuit;
    a resistive load connected to the half-bridge power converter, wherein the half-bridge power converter provides the resistive load with a second power level that differs from the first power level.

12. The apparatus of claim 11, wherein the charging current flowpath passes through the bootstrap capacitor.

13. The apparatus of claim 12, wherein the charging current flowpath passes through a bootstrap resistor and a bootstrap diode.

14. The apparatus of claim 11, wherein the half-bridge power converter further comprises a blocking capacitor connected between a primary winding of the transformer and the pre-charging circuit, wherein the blocking capacitor has a higher capacitance than the first capacitor bank and the second capacitor bank, and wherein the blocking capacitor has a higher capacitance than the bootstrap capacitor.

15. The apparatus of claim 11, wherein the pre-charging circuit further comprises:

a pre-charge resistor in series with a primary winding of the transformer; and a pre-charge switching device connected to the first pre-charge resistor.

16. The apparatus of claim 15, wherein the pre-charge switching device is an N-channel MOSFET, and wherein the first pre-charge resistor is connected to a drain of the N-channel MOSFET.

17. The apparatus of claim 16, further comprising:
a gate pull-down resistor connected between a gate of the N-channel MOSFET and a primary ground.

18. The apparatus of claim 11, further comprising:
a high-side switching device;
a low-side switching device; and
a driver IC chip connected to the high-side switching device and the low side switching device to control a set of switching cycles of the half-bridge power converter;
wherein the pre-charging circuit is located in parallel with the low-side switching device.

19. The apparatus of claim 11, further comprising:
a pair of synchronous rectification devices disposed on the secondary side of the of the half-bridge power converter, wherein each of the pair of synchronous rectification devices has an equal power rating.

20. A method for starting a half-bridge power converter, the method comprising: activating a pre-charge switching device for a charging interval duration, wherein the pre-charge switching device is located on a primary side of the half-bridge power converter; supplying a current through a charging current flowpath for the charging interval duration to charge a bootstrap capacitor located on the primary side; wherein the bootstrap capacitor is configured to be charged by current flowing through the charging current flowpath that extends at least through the pre-charge switching device located on the primary side, wherein the pre-charge switching device reduces a voltage imbalance between a first capacitor bank and a second capacitor bank; deactivating the pre-charge switching device after the charging interval duration; and alternately activating a high-side switching device and a low-side switching device, wherein the high-side switching device and the low-side switching device are located on the primary side; and wherein the high-side switching device is activated a least in part using the charge on the bootstrap capacitor.

21. The method of claim 20, further comprising:
delaying for a transition delay before the step of alternately activating the high-side switching device and the low-side switching device.

22. The method of claim 20, wherein the current supplied through the charging current flowpath charges a bootstrap capacitor in the charging current flowpath.

23. The method of claim 20; further comprising:
discharging a second capacitor bank through a discharging current flowpath for the charging interval duration, wherein the discharging current flowpath passes through the pre-charge switching device.

* * * * *